(12) United States Patent
Ruder et al.

(10) Patent No.: US 12,410,854 B2
(45) Date of Patent: Sep. 9, 2025

(54) AUTOMOTIVE DRIVETRAIN GEARBOX INCLUDING DIFFERENTIAL AND PLANET GEARS WITH BLADES

(71) Applicant: Schaeffler Technologies AG & Co. KG, Herzogenaurach (DE)

(72) Inventors: Viktor Ruder, Furth (DE); Andreas Rosenwald, Nuremberg (DE); Gunter Volkel, Puschendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/516,905

(22) Filed: Nov. 21, 2023

(65) Prior Publication Data

US 2025/0163999 A1   May 22, 2025

(51) Int. Cl.
| | | |
|---|---|---|
| F16H 48/08 | (2006.01) | |
| F16H 57/031 | (2012.01) | |
| F16H 57/037 | (2012.01) | |
| F16H 57/04 | (2010.01) | |
| F16H 48/38 | (2012.01) | |
| F16H 57/02 | (2012.01) | |

(52) U.S. Cl.
CPC ........... *F16H 48/08* (2013.01); *F16H 57/031* (2013.01); *F16H 57/037* (2013.01); *F16H 57/0427* (2013.01); *F16H 57/0452* (2013.01); *F16H 57/0483* (2013.01); *F16H 2048/085* (2013.01); *F16H 2048/087* (2013.01); *F16H 2048/385* (2013.01); *F16H 2057/02052* (2013.01)

(58) Field of Classification Search
CPC ...... F16H 48/08; F16H 57/031; F16H 57/037; F16H 57/0427; F16H 57/0452; F16H 57/0483; F16H 2048/085; F16H 2048/087; F16H 2048/385; F16H 2057/02052
See application file for complete search history.

(56) References Cited

U.S. PATENT DOCUMENTS

| | | | |
|---|---|---|---|
| 11,162,576 B2 * | 11/2021 | Di Giovanni | ............ F16H 1/36 |
| 11,649,884 B1 | 5/2023 | Verbridge et al. | |
| 2019/0271386 A1 * | 9/2019 | Suzuki | ..................... F16H 48/08 |
| 2022/0372912 A1 * | 11/2022 | Kubiak | ............... F16H 57/0482 |
| 2022/0381228 A1 * | 12/2022 | Li | ........................... F03D 15/00 |
| 2023/0068579 A1 * | 3/2023 | Suzuki | ................ F16H 57/0471 |

FOREIGN PATENT DOCUMENTS

JP    2005008143 A  *  1/2005  ............... F16H 1/28

* cited by examiner

*Primary Examiner* — Farhana Pervin
(74) *Attorney, Agent, or Firm* — Davidson Kappel LLC

(57) ABSTRACT

A drive assembly for a motor vehicle drivetrain includes a differential configured for driving a first output shaft and a second output shaft about a center axis and for allowing the first output shaft and the second output shaft to rotate about the center axis at different speeds, and planet gears each rotatably mounted on a respective planet carrier. The planet gears each include a radially extending surface and blades circumferentially spaced part from each other. The blades axially protrude from the radially extending surface for directing a fluid flow axially toward the differential during operation of the drive assembly.

16 Claims, 5 Drawing Sheets

AUTOMOTIVE DRIVETRAIN GEARBOX INCLUDING DIFFERENTIAL AND PLANET GEARS WITH BLADES

TECHNICAL FIELD

The present disclosure relates generally to motor vehicle drivetrains, and more specifically to differentials in gearboxes for motor vehicle drivetrains.

BACKGROUND

When a differential is supplied with oil via oil sump lubrication and no pump is present to provide oil to the differential of a gearbox, oil supply is difficult, especially at low speeds and high torques.

SUMMARY

A drive assembly for a motor vehicle drivetrain includes a differential configured for driving a first output shaft and a second output shaft about a center axis and for allowing the first output shaft and the second output shaft to rotate about the center axis at different speeds, and planet gears each rotatably mounted on a respective planet carrier. The planet gears each include a radially extending surface and blades circumferentially spaced part from each other. The blades axially protrude from the radially extending surface for directing a fluid flow axially toward the differential during operation of the drive assembly.

In examples, each of the planet gears includes a disc-shaped base portion rotatably mounted on the respective planet carrier and an outer ring on an outer diameter of the disc-shaped base portion, each outer ring including a plurality of teeth on an outer circumferential surface thereof, the outer ring including the radially extending surface from which the blades axially protrude.

In examples, the outer ring includes an axially extending surface, the axially extending surface extending from a radially outermost edge of the disc-shaped base portion to the radially extending surface of the outer ring.

In examples, for each of the planet gears, an axially facing edge of at least one of the blades defines a surface of the planet gear that is axially closest to the differential than any other surface of the planet gear.

In examples, the differential further includes: a first side gear on a first side of the differential configured for being drivingly connected to the first output shaft; a second side gear on a second side of the differential configured for being drivingly connected to the second output shaft; a differential housing enclosing the first and second side gears; support pins non-rotatably fixed to the differential housing; and spider gears rotatably mounted on the support pins and positioned between the first side gear and the second side gear, each of the spider gears intermeshing with both the first side gear and the second side gear to transmit power from the support pins to the first side gear and the second side gear, the planet carriers drivingly connected to the differential housing to transmit power from the planet gears to the differential.

In examples, the differential housing includes an axial end that axially faces away from the spider gears, the axial end of the differential housing including axially extending holes extending through differential housing into an interior of the differential housing to supply the fluid flow directed by the blades through the differential housing to the spider gears during operation of the drive assembly.

In examples, the differential housing includes a differential carrier carrying the support pins, the differential carrier including an annular rim at the axial end including axially extending grooves in an inner circumferential surface of the annular rim partially defining the axially extending holes.

In examples, the differential housing includes a differential cover connected to the differential carrier and received inside of the annular rim.

In examples, the differential cover is axially fixed in place in the annular rim by a retainer, the retainer and the axially extending grooves together defining the axially extending holes.

In examples, the differential cover including a radially extending surface that extends radially inward from an outer diameter of the differential cover, the radially extending surface of the differential cover being axially further away from the blades than a radially extending surface of the annular rim that axially faces the planet gears and that extends from the inner circumferential surface of the annular rim to an outer circumferential surface of the annular rim.

In examples, the annular rim is axially aligned with the planet carriers.

In examples, during operation of the drive assembly, the blades follow a path having an inner radial extent that is closer to a center axis of the drive assembly than the inner circumferential surface of the annular rim is to the center axis.

In examples, the differential housing includes a base section surrounding the spider gears and a flange protruding radially outward from the base section, the planet carriers being non-rotatably fixed to the flange.

In examples, the drive assembly further includes a sun gear driving the planet gears; and a hollow drive shaft, the sun gear being non-rotatably fixed to an outer diameter of the hollow drive shaft.

In examples, the first output shaft is received inside of the hollow drive shaft to define a tubular gap configured to direct fluid flow toward the planet gears.

A gearbox is also provided including the drive assembly; and a gearbox housing defining a sump for receiving oil for lubricating the differential, the differential and the planet gears being received inside of the gearbox housing.

A method of constructing a drive assembly for a motor vehicle drivetrain is also provided. The method includes inserting a first side gear, a second side gear, support pins and spider gears inside a differential housing; arranging planet gears including blades adjacent to the differential housing, the planet gears being arranged such that during operation of the drive assembly, the blades follow a path having an inner radial extent that is closer to a center axis of the drive assembly than an outer diameter of the differential housing is to the center axis, the spider gears being rotatably mounted on the support pins and positioned between the first side gear and the second side gear, each of the spider gears intermeshing with both the first side gear and the second side gear to transmit power from the support pins to the first side gear and the second side gear for allowing the first side gear and the second side gear to rotate about the center axis at different speeds.

In examples, the method further includes creating axially extending holes in an axial end of the differential housing facing the planet gears, the axially extending holes extending through differential housing into an interior of the differential housing to supply a fluid flow directed by the blades through the differential housing to the spider gears during operation of the drive assembly.

In examples, the differential housing includes a differential cover and a differential carrier, and the inserting of the first side gear, the second side gear, the support pins and the spider gears inside the differential housing includes: inserting the first side gear, the second side gear, the support pins and the spider gears inside the differential carrier; and then connecting the differential cover to the differential carrier, the differential cover forcing the first side gear into the spider gears, the axially extending holes being at an interface between the differential carrier and the differential cover.

In examples, the differential carrier includes an annular rim at the axial end including axially extending grooves in an inner circumferential surface of the annular rim partially defining the axially extending holes, the connecting of the differential cover to the differential carrier including inserting the differential cover into the annular rim and axially fixing the differential cover to the differential carrier via a retainer.

BRIEF DESCRIPTION OF THE DRAWINGS

The present disclosure is described below by reference to the following drawings, in which.

DETAILED DESCRIPTION

Figure 1:
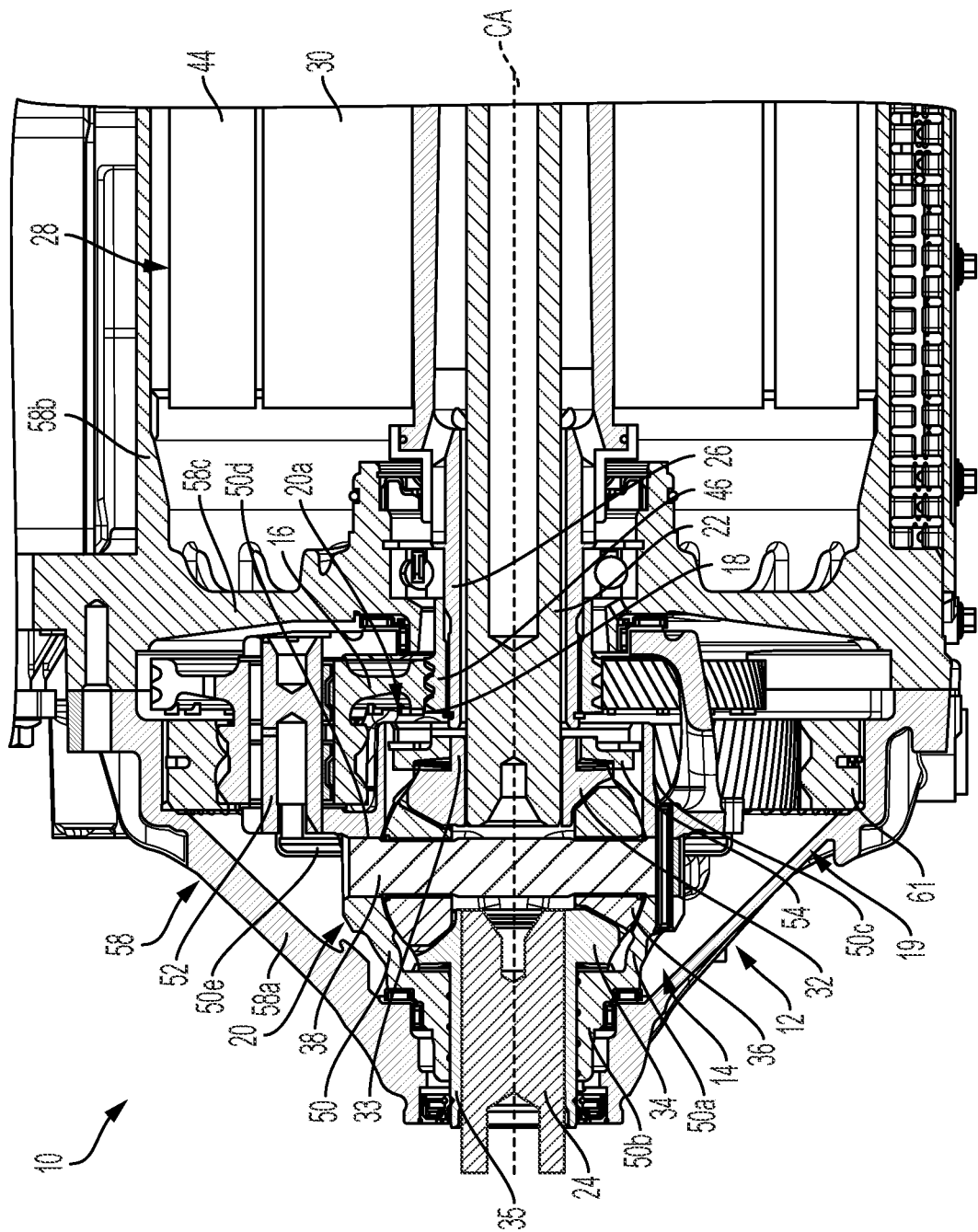
FIG. 1 shows a radial cross-sectional view of a drive unit of a motor vehicle drivetrain including a drive assembly, which includes a gearbox including a differential, planet gears including blades, and an oil sump.
Figure 2:
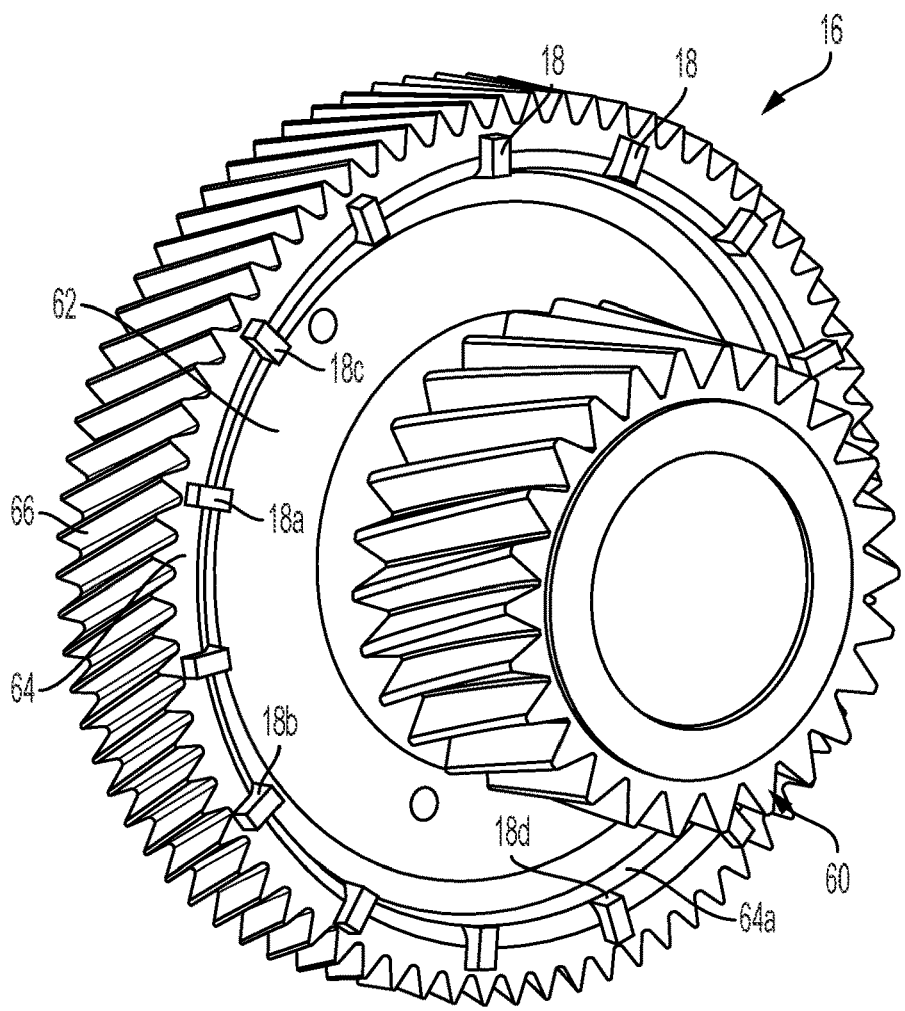
FIG. 2 shows an enlarged radial cross-sectional view of the gearbox of FIG. 1.
Figure 3:
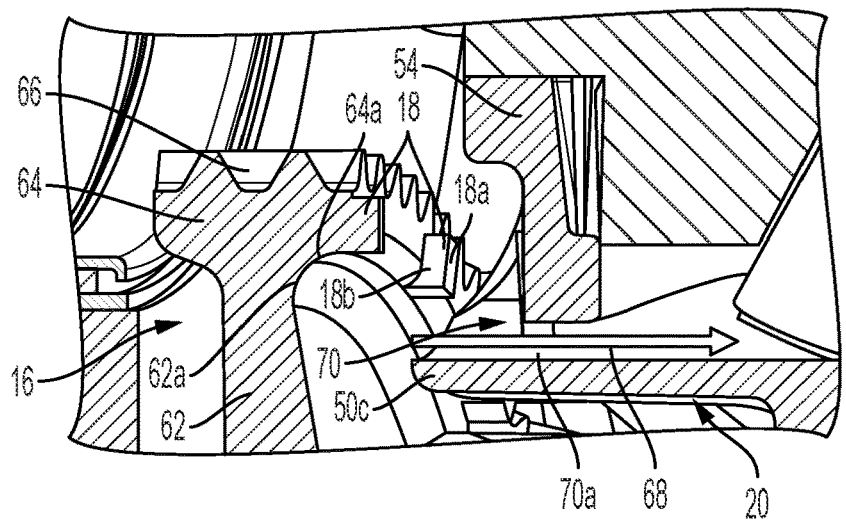
FIG. 3 shows a further enlarged radial cross-sectional view of the gearbox of FIG. 1.

FIG. 1 shows a radial cross-sectional view of a drive unit 10 of a motor vehicle drivetrain including a drive assembly, which includes a gearbox 12 including a differential 14, planet gears 16 including blades 18, and an oil sump 19; FIG. 2 shows an enlarged radial cross-sectional view of the gearbox 12; and FIG. 3 shows a further enlarged radial cross-sectional view of the gearbox 12. The planet gears 16 each include a radially extending surface 16a and blades 18 circumferentially spaced part from each other. The blades 18 axially protrude from the radially extending surface 16a for directing a fluid flow axially toward the differential 14 during operation of the drive assembly.

Gearbox 12 further includes a first output shaft 22 and a second output shaft 24 is configured for driving a first axle and a second axle of the motor vehicle drivetrain about a center axis CA and for allowing the first output shaft 22 and the second axle to rotate about the center axis CA at different speeds. The first output shaft 22 is received inside of the hollow drive shaft 26 to define a tubular gap G configured to direct fluid flow F toward the planet gears 16.

In the example shown in FIGS. 1, the differential 14 receives a power input from an electric motor 28 via drive shaft 26, which is a rotor shaft non-rotatably connected a rotor 30 of electric motor 28. In other example, the input shaft can be driven by an internal combustion engine alone, or in combination with an electric motor when the vehicle is a hybrid. The differential 14 further includes a first side gear 32 on a first side of the differential 14 configured for being drivingly connected to the first output shaft 22 to transmit power from input shaft 26 to the first output shaft 22 for driving a first wheel of the motor vehicle drivetrain.

The differential 14 also includes a second side gear 34 on a second side of the differential 14 configured for being drivingly connected to the second output shaft 24 to transmit power to the first output shaft 22 for driving a second wheel of the motor vehicle drivetrain. Spider gears 36 are rotatably mounted on support pins 38, which are positioned between the first side gear 32 and the second side gear 34. Each of the spider gears 36 intermeshes with both the first side gear 32 and the second side gear 34 to transmit power from the support pins 38 to the first side gear 32 and the second side gear 34. First side gear 32 includes a tubular hub 33 having an inner circumferential surface that includes teeth or splines for non-rotatably fixing first side gear 32 with respect to first output shaft 22. Second side gear 34 includes a tubular hub 35 having an inner circumferential surface that includes teeth or splines for non-rotatably fixing second side gear 34 with respect to second output shaft 24.

In the example of FIGS. 1 to 3, as noted above, drive shaft 26 is the rotor shaft of an electric motor 28, with drive shaft 26 being non-rotatably fixed to rotor 30 of electric motor 28 and being rotated about center axis CA with rotor 30 by a stator 44 of electric motor 28 in a known manner. Drive shaft 26 is provided with a sun gear 46 non-rotatably fixed to the outer diameter thereof. Sun gear 46 drives planet gears 16, which in turn drive a differential carrier 50 of differential 14 via planet carriers 52. Carrier 50 is configured for transmitting power from the planet gears 16 to the support pins 38. In particular, carrier 50 includes radially extending slots 50d formed therein, and each of the support pins 38 extends into a respective one of the slots 50d. Carrier 50 includes a rounded base section 50a, which curves away from center axis CA, surrounding spider gears 36 and carrying support pins 38, and a tubular hub section 50b surrounding tubular hub 35 such that second side gear 34 is rotatable with respect to carrier 50. On an opposite of carrier 50 as tubular hub section 50b, carrier 50 includes an annular rim 50c. Carrier 50 further includes a flange 50e protruding radially outward from the base section 50b, and the planet carriers 52 are non-rotatably fixed to the flange 50c.

Differential housing 20 further includes a differential cover 54 axially fixed to carrier 50 to hold first side gear 32 axially in place inside of carrier 50. More specifically, cover 54 is received within annular rim 50c of carrier 50 and is held axially in place by a retainer in the form of snap ring 56 provided in a groove on an inner circumferential surface of annular rim 50c. The annular rim 50c is axially aligned with the planet gears 16. During operation of the drive assembly, the blades 18 follow a path having an inner radial extent that is closer to center axis CA of the drive assembly than the inner circumferential surface of the annular rim 50c is to the center axis CA. This allows blades 18 to advantageously direct fluid into the annular rim 50c, and into the interior of the differential housing 20.

Drive unit 10 includes a housing 58 that is formed by a first end housing section 58a axially and radially surrounding differential 14 and gears 46, 16, an intermediate housing section 58b radially surrounding electric motor 28 and a second end housing section 58c axially enclosing electric motor 28. Intermediate housing section 58b includes a radially extending annular wall 58d defining, together with first end housing section 58a, a housing of gearbox 12. The housing of gearbox 12 defines oil sump 19, which is a lubrication chamber provided within gearbox 12 that is provided with oil for lubricating differential 14 during operation.

Planet gears 16 are each part of a compound planet gear set that further include an auxiliary gear 60 formed as a single piece with the respective planet gear 16. Each auxiliary gear 60 is axially offset from the respective planet gear 16 and engages with a ring gear 61 that is fixed to housing 58.

FIGS. 2 and 3 show enlarged view of one of planet gears 16 to illustrate the configuration of blades 18 on each of planet gears 16. The planet gear 16 includes a radially extending surface 16a and blades 18 circumferentially spaced part from each other. The blades 18 axially protrude from the radially extending surface 16a for directing a fluid flow axially toward the differential 14 during operation of the drive assembly.

Each of the planet gears 16 includes a disc-shaped base portion 62 rotatably mounted on the respective planet carrier 52 and an outer ring 64 on an outer diameter of the disc-shaped base portion 62. Each outer ring 64 including a plurality of teeth 66 on an outer circumferential surface thereof, and further includes the radially extending surface 16a from which the blades 18 axially protrude. The outer ring 64 includes an axially extending surface 64a that extends from a radially outermost edge 62a of the disc-shaped base portion 62 to the radially extending surface 16a of the outer ring 64. For each of the planet gears 16, an axially facing edge 18a of at least one of the blades 18 defines a surface of the planet gear 16 that is axially closest to the differential than any other surface of the planet gear 16. Each blade 18 includes two opposite circumferentially facing surfaces 18b, with one of surfaces 18b displacing fluid as planet gears 16 are rotated about center axis CA (FIG. 1). Blades 18 also include an outer diameter surface 18c and an inner diameter surface 18d.

Figure 4:
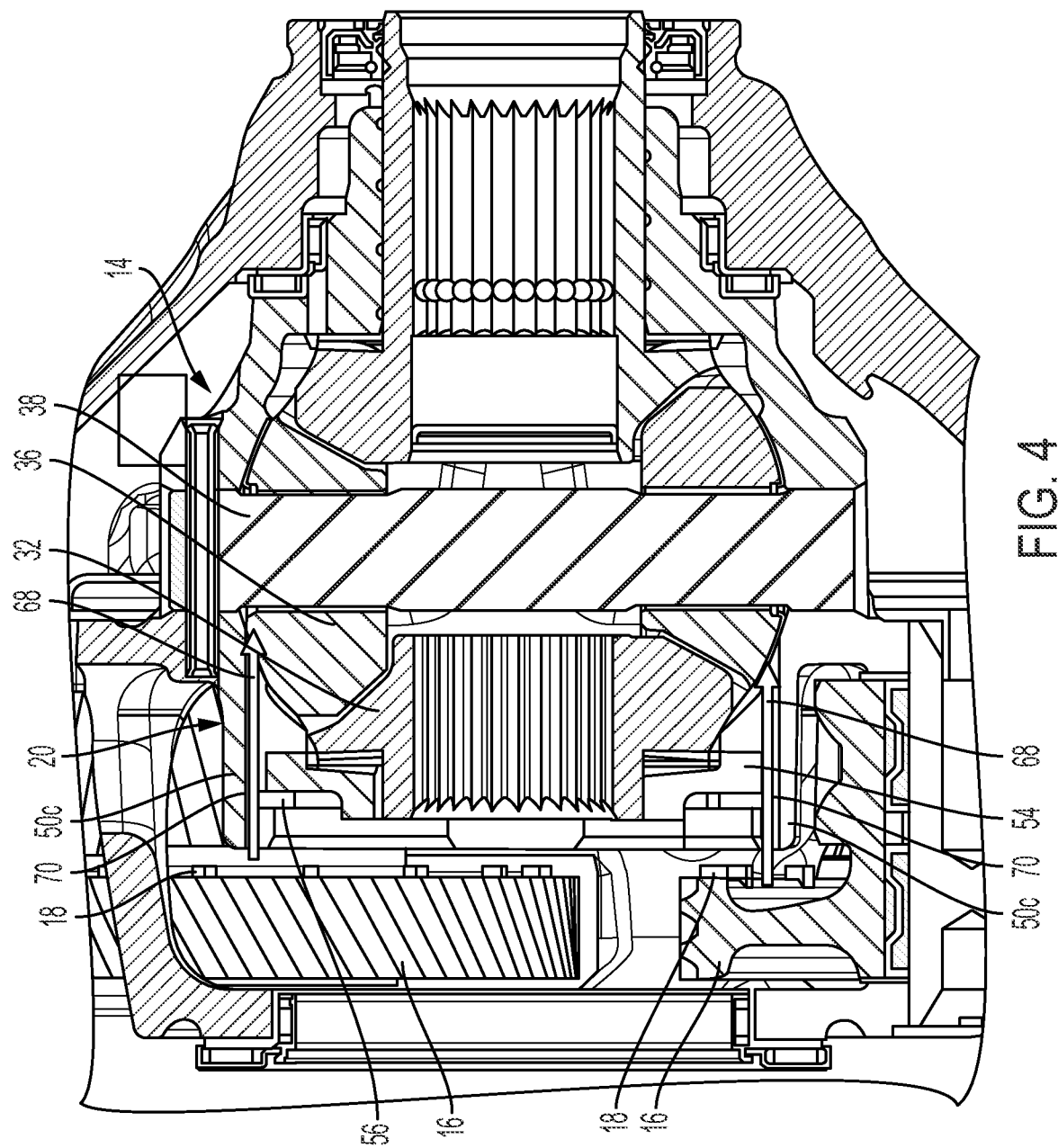
FIG. 4 shows a further radial cross-sectional view illustrating the differential and the planet gears.

FIG. 4 shows a further radial cross-sectional view illustrating the differential 14 and the planet gears 16. As shown in FIGS. 3 and 4, a fluid flow 68 generated by blades 18 flows through axially extending holes 70, which are circumferentially spaced apart from each other, formed in housing 20. Specifically, referring to FIGS. 1 and 3 together, axially extending holes 70 are formed in an axial end 20a of differential housing 20 that faces away from spider gears 36. Holes 70 extend through the differential housing 20 into an interior of the differential housing 20 to supply the fluid flow directed by the blades 18 through the differential housing 20 to the spider gears 36 during operation of the drive assembly. More specifically, annular rim 50c at the axial end 20a includes axially extending grooves 70a in an inner circumferential surface of the annular rim partially defining the axially extending holes 70.

Figure 6:
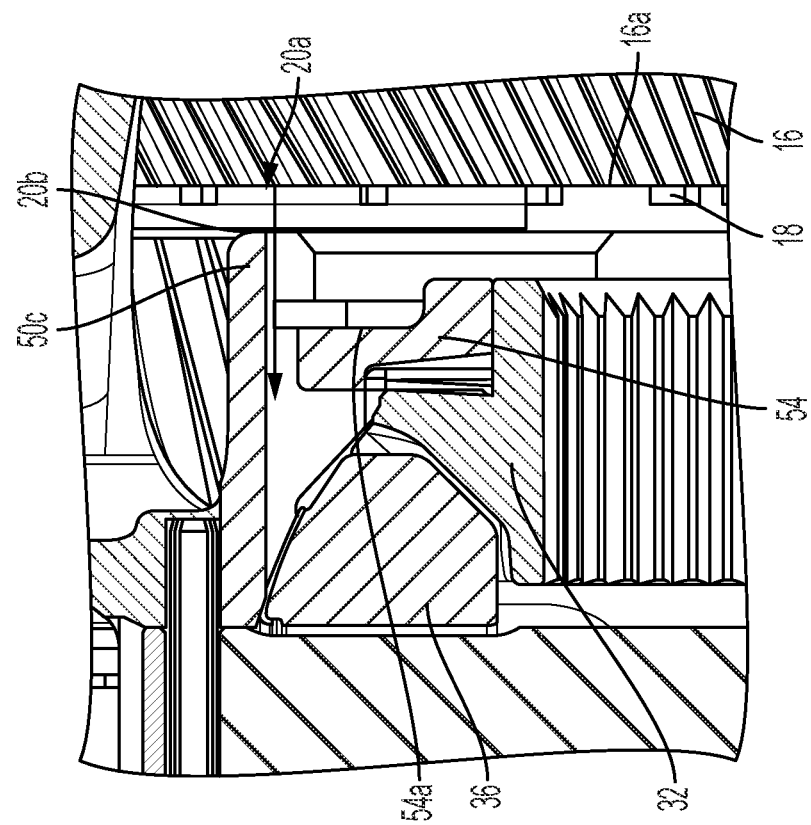
FIG. 6 also shows a radial cross-sectional of the axial end of the differential housing.
Figure 5:
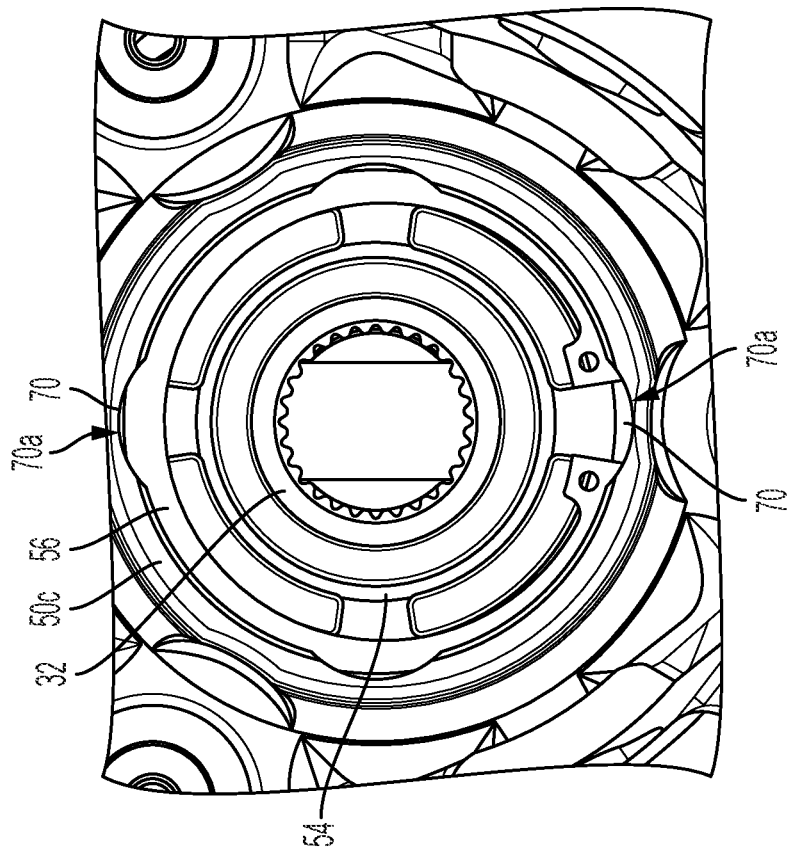
FIG. 5 shows a view looking axially into the differential from the position of planet gears.

As noted above, the differential cover 54 of differential housing 20 is axially fixed in place in the annular rim 50c by a retainer in the form of a snap ring 56, which forms part of the axially extending holes 70 together with the axially extending grooves 70a, as shown further in FIG. 5, which is a view looking axially into from the position of planet gears 16. In other words, FIG. 5 is an axially facing view in the axial direction of fluid flow 68. FIG. 6 also shows a radial cross-sectional of the axial end 20a of differential housing 20.

As shown in FIG. 6, the differential cover 54 includes a radially extending surface 54a that extends radially inward from an outer diameter of the differential cover 54. The radially extending surface 54a of the differential cover 54 is axially further away from the blades 18 than a radially extending surface 20b of the annular rim 50c that axially faces the planet gears 16. Surface 20b extends from the inner circumferential surface of the annular rim 50c to an outer circumferential surface of the annular rim 50c.

Figure 8:
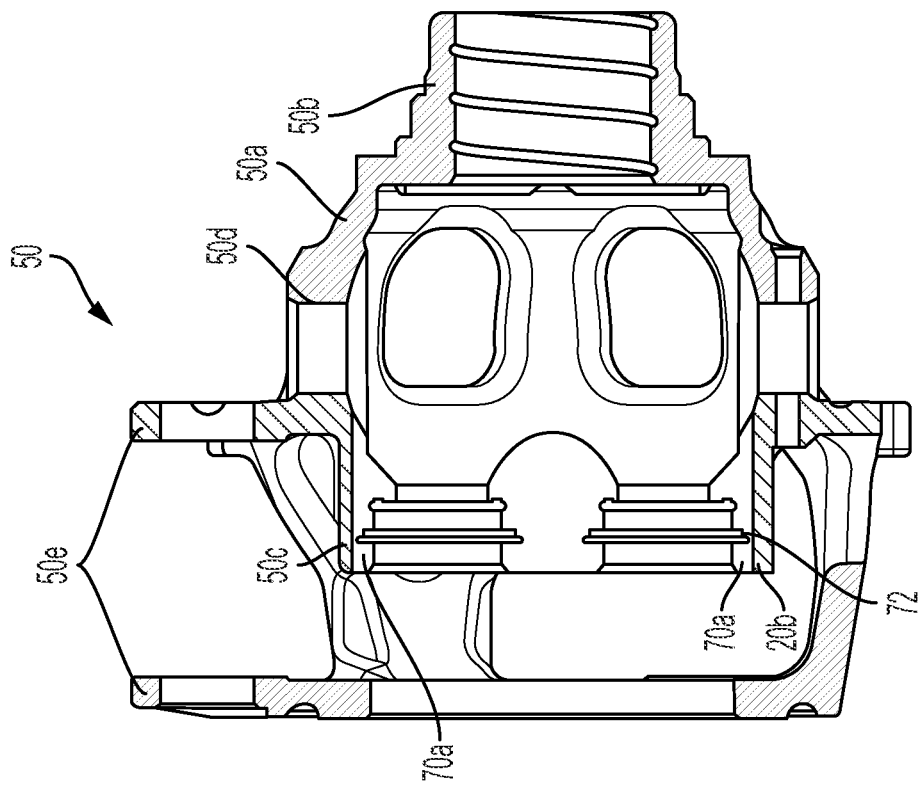
FIG. 8 shows standalone radial cross-sectional view of the differential carrier.
Figure 7:
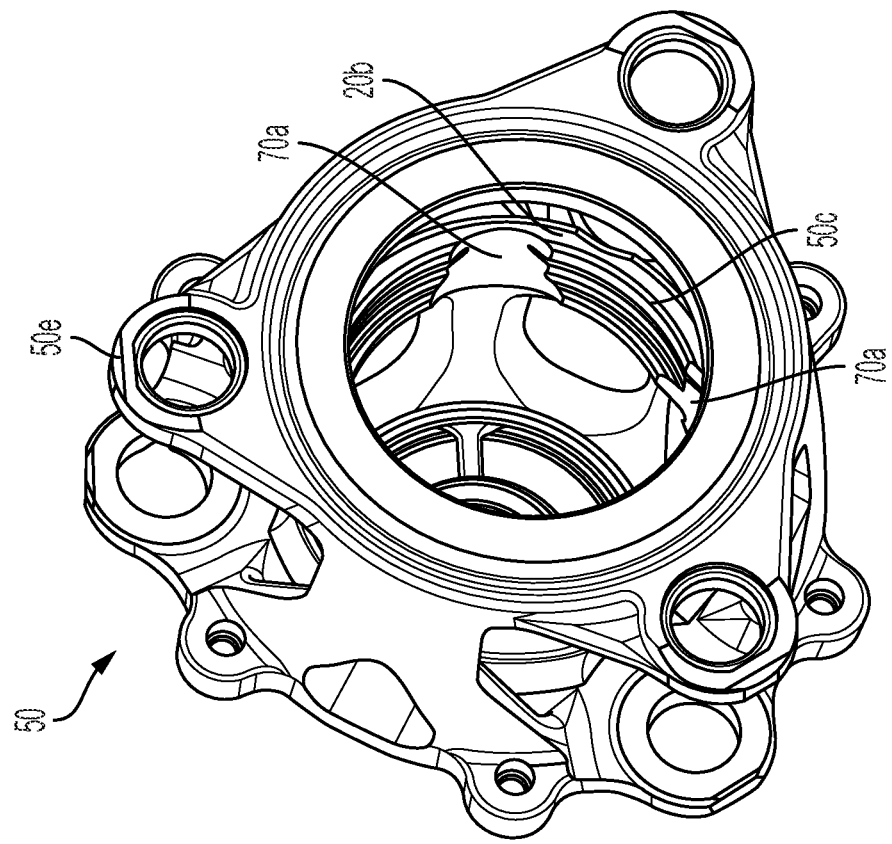
FIG. 7 shows standalone perspective view of the differential carrier, illustrating axially extending grooves on the inner circumferential surface of annular rim.

FIGS. 7 and 8 show standalone perspective view and radial cross-sectional views, respectively, of the differential carrier 50, illustrating axially extending grooves 70a on the inner circumferential surface of annular rim 50c and an annular groove 72 for receiving the snap ring 56.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

REFERENCE NUMERALS 10 drive unit
12 gearbox
14 differential
16 planet gears
16a radially extending surface
18 blades
18a axially facing edge
18b two opposite circumferentially facing surfaces
18c outer diameter surface
18d inner diameter surface
19 oil sump
20 differential housing
20a axial end
20b radially extending surface
22 first output shaft
24 second output shaft
26 drive shaft
28 electric motor
30 rotor
32 first side gear
33 tubular hub
34 second side gear
35 tubular hub
36 spider gears
38 support pins
44 stator
46 sun gear
50 carrier
50a rounded base section
50b tubular hub section
50c annular rim
50d slots
50e flange
52 planet carriers
54 differential cover
54a radially extending surface
56 snap ring
58 housing
58a first end housing section
58b intermediate housing section
58c second end housing section
58d radially extending annular wall 60 auxiliary gear
61 ring gear
62 disc-shaped base portion
62a radially outermost edge
64 outer ring
64a axially extending surface
66 plurality of teeth
68 fluid flow
70 axially extending holes
70a axially extending grooves
72 annular groove

What is claimed is:

1. A drive assembly for a motor vehicle drivetrain, the drive assembly comprising:
a differential configured for driving a first output shaft and a second output shaft about a center axis and for allowing the first output shaft and the second output shaft to rotate about the center axis at different speeds; and
planet gears each rotatably mounted on a respective planet carrier,
the planet gears each including a radially extending surface and blades circumferentially spaced part from each other, the blades axially protruding from the radially extending surface for directing a fluid flow axially toward the differential during operation of the drive assembly.

2. The drive assembly as recited in claim 1 wherein each of the planet gears includes a disc-shaped base portion rotatably mounted on the respective planet carrier and an outer ring on an outer diameter of the disc-shaped base portion, each outer ring including a plurality of teeth on an outer circumferential surface thereof, the outer ring including the radially extending surface from which the blades axially protrude.

3. The drive assembly as recited in claim 2 wherein the outer ring includes an axially extending surface, the axially extending surface extending from a radially outermost edge of the disc-shaped base portion to the radially extending surface of the outer ring.

4. The drive assembly as recited in claim 3 wherein, for each of the planet gears, an axially facing edge of at least one of the blades defines a surface of the planet gear that is axially closest to the differential than any other surface of the planet gear.

5. The drive assembly as recited in claim 2 wherein the differential includes:
a first side gear on a first side of the differential configured for being drivingly connected to the first output shaft;
a second side gear on a second side of the differential configured for being drivingly connected to the second output shaft;
a differential housing enclosing the first and second side gears;
support pins non-rotatably fixed to the differential housing; and
spider gears rotatably mounted on the support pins and positioned between the first side gear and the second side gear, each of the spider gears intermeshing with both the first side gear and the second side gear to transmit power from the support pins to the first side gear and the second side gear,
the planet carriers drivingly connected to the differential housing to transmit power from the planet gears to the differential.

6. The drive assembly as recited in claim 5 wherein the differential housing includes an axial end that axially faces away from the spider gears, the axial end of the differential housing including axially extending holes extending through differential housing into an interior of the differential housing to supply the fluid flow directed by the blades through the differential housing to the spider gears during operation of the drive assembly.

7. The drive assembly as recited in claim 6 wherein the differential housing includes a differential carrier carrying the support pins, the differential carrier including an annular rim at the axial end including axially extending grooves in an inner circumferential surface of the annular rim partially defining the axially extending holes.

8. The drive assembly as recited in claim 7 wherein the differential housing includes a differential cover connected to the differential carrier and received inside of the annular rim.

9. The drive assembly as recited in claim 8 wherein the differential cover is axially fixed in place in the annular rim by a retainer, the retainer and the axially extending grooves together defining the axially extending holes.

10. The drive assembly as recited in claim 8 wherein the differential cover including a radially extending surface that extends radially inward from an outer diameter of the differential cover, the radially extending surface of the differential cover being axially further away from the blades than a radially extending surface of the annular rim that axially faces the planet gears and that extends from the inner circumferential surface of the annular rim to an outer circumferential surface of the annular rim.

11. The drive assembly as recited in claim 7 wherein the annular rim is axially aligned with the planet carriers.

12. The drive assembly as recited in claim 11 wherein during operation of the drive assembly, the blades follow a path having an inner radial extent that is closer to a center axis of the drive assembly than the inner circumferential surface of the annular rim is to the center axis.

13. The drive assembly as recited in claim 5 wherein the differential housing includes a base section surrounding the spider gears and a flange protruding radially outward from the base section, the planet carriers being non-rotatably fixed to the flange.

14. The drive assembly as recited in claim 1 further comprising:
a sun gear driving the planet gears; and
a hollow drive shaft, the sun gear being non-rotatably fixed to an outer diameter of the hollow drive shaft.

15. The drive assembly as recited in claim 14 wherein the first output shaft is received inside of the hollow drive shaft to define a tubular gap configured to direct fluid flow toward the planet gears.

16. A gearbox comprising:
the drive assembly as recited in claim 1;
a gearbox housing defining a sump for receiving oil for lubricating the differential, the differential and the planet gears being received inside of the gearbox housing.

* * * * *